United States Patent
Nagasaki

(10) Patent No.: US 8,523,520 B2
(45) Date of Patent: Sep. 3, 2013

(54) BLADE PITCH CONTROL SYSTEM, WIND TURBINE GENERATOR, AND BLADE PITCH CONTROL METHOD

(75) Inventor: Momoe Nagasaki, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/117,802

(22) Filed: May 27, 2011

(65) Prior Publication Data

US 2012/0061962 A1  Mar. 15, 2012

Related U.S. Application Data

(63) Continuation of application No. PCT/JP2011/055792, filed on Mar. 11, 2011.

(51) Int. Cl.
*F03D 7/04*  (2006.01)

(52) U.S. Cl.
USPC .................. 416/1; 416/35; 416/61; 416/156

(58) Field of Classification Search
USPC ............................ 416/1, 35, 61, 156; 700/33
See application file for complete search history.

(56) References Cited

U.S. PATENT DOCUMENTS

| | | | |
|---|---|---|---|
| 6,361,275 B1 | 3/2002 | Wobben | |
| 7,476,985 B2 * | 1/2009 | Llorente Gonzalez | 290/44 |
| 7,571,013 B2 | 8/2009 | Altemark | |
| 2007/0041837 A1 | 2/2007 | Ide et al. | |

(Continued)

FOREIGN PATENT DOCUMENTS

| | | |
|---|---|---|
| JP | 2001511497 | 8/2001 |
| JP | 2002339855 A | 11/2002 |
| JP | 2005325742 | 11/2005 |
| JP | 2007530856 | 11/2007 |

OTHER PUBLICATIONS

International Search Report for PCT/JP2011/055792 mailed Apr. 12, 2011.

(Continued)

*Primary Examiner* — Edward Look
*Assistant Examiner* — Jason Davis
(74) *Attorney, Agent, or Firm* — Kanesaka Berner & Partners, LLP

(57) ABSTRACT

A wind turbine generator generates power through rotation of a rotor to which a plurality of blades are pivotally coupled and includes a pitch-angle control section that outputs a pitch-angle command value that indicates the amount of change in the pitch angle of each of the blades, hydraulic cylinders each of which changes the pitch angle of the corresponding blade based on the corresponding pitch-angle command value output from the pitch-angle control section, and load measurement sections that measure blade-root loads. A set value indicating that wind received by the wind turbine generator has a biased wind speed distribution is set in advance in the pitch-angle control section. Only when a calculated pitch-angle command value exceeds the set value, the pitch-angle control section outputs a pitch-angle command value beyond pitch command limit values. Therefore, in the wind turbine generator, a higher load than necessary is not imposed on a drive unit for the pitch angle of each of the blades in a case of a normal wind speed or a wind speed distribution caused by the normal wind speed, and the blade-root load can be sufficiently reduced even in a case of a wind speed distribution that occurs when a strong wind is received.

4 Claims, 11 Drawing Sheets

(56) References Cited

U.S. PATENT DOCUMENTS

| | | | |
|---|---|---|---|
| 2007/0116572 A1* | 5/2007 | Barbu et al. | 416/132 B |
| 2007/0212209 A1 | 9/2007 | Borgen | |
| 2010/0290905 A1 | 11/2010 | Knudsen | |
| 2011/0193343 A1* | 8/2011 | Nakashima et al. | 290/44 |
| 2011/0211951 A1* | 9/2011 | Kooijman et al. | 416/1 |

OTHER PUBLICATIONS

Decision to Grant as issued on Jan. 10, 2013 for corresponding Korean Patent Application No. 2011-7013628.

Decision to Grant as issued on Mar. 5, 2013 for corresponding Japanese Patent Application No. 2011-523232.

* cited by examiner

BLADE PITCH CONTROL SYSTEM, WIND TURBINE GENERATOR, AND BLADE PITCH CONTROL METHOD

CROSS REFERENCE TO RELATED APPLICATIONS

This is a continuation of International Application PCT/JP2011/055792, with an international filing date of Mar. 11, 2011, which is hereby incorporated by reference herein in its entirety.

TECHNICAL FIELD

The present invention relates to a blade pitch control system, a wind turbine generator, and a blade pitch control method.

BACKGROUND ART

In some types of wind turbine generators, independent pitch control can be executed in which loads imposed on the roots of a plurality of blades (for example, blade-root loads or moments) are reduced to protect equipment, and the pitch angles of the blades are independently controlled to reduce fluctuations of the loads, through a pitching operation of the blades performed in consideration of the wind speed distribution (wind shear) and the wind direction.

Limits are set on a pitch-angle command value, which is used to control the pitch angle of each blade. PTL1 describes that a limiter is provided in a wind turbine generator to limit the setting range of the pitch-angle command value, based on the magnitude relationships between an output-power set value and the rated power of the generator and between a rotational-speed set value and the rated rotor speed of the rotor.

CITATION LIST

Patent Literature

{PTL 1} Japanese Unexamined Patent Application, Publication No. 2002-339855

SUMMARY OF INVENTION

Technical Problem

Therefore, even when independent pitch control is executed, the pitch angles can be changed only within the range of limit values set for the pitch-angle command value. Thus, for example, in a calculation in which an extreme wind shear (for example, an extreme wind shear that supposedly occurs once every 50 years) is imposed in the horizontal direction or the vertical direction of the wind turbine generator, in some cases the loads cannot be reduced just by changing the pitch angle within the range of the limit values.

Note that, when the range of the pitch command limit values is broadened, the pitch of each blade is always driven in the broadened fluctuation range, and a higher load than necessary may be imposed on a drive unit for the pitch angle, which is not preferable. In particular, when the pitch angle is controlled with the pressure of hydraulic oil, the temperature of the hydraulic oil may be excessively increased, exceeding a permissible value, in some cases.

The present invention has been made in view of these circumstances, and an object thereof is to provide a blade pitch control system, a wind turbine generator, and a blade pitch control method, in which a higher load than necessary is not imposed on the drive unit for the pitch angle of each blade in the case of a normal wind speed or a wind speed distribution caused by the normal wind speed, and the load imposed on the blade is sufficiently reduced even in the case of a wind speed distribution that occurs when a strong wind is received.

Solution to Problem

In order to solve the above-described object, the blade pitch control system, the wind turbine generator, and the blade pitch control method of the present invention employ the following solutions.

Specifically, according to the present invention, there is provided a blade pitch control system for a wind turbine generator that generates power through rotation of a rotor coupled to a plurality of blades whose pitch angles can be independently controlled, the blade pitch control system including: pitch angle control part for outputting a command value that indicates the amount of change in each of the pitch angles; actuators each of which changes the corresponding pitch angle based on the corresponding command value output from the pitch angle control part; and measurement part for measuring a load imposed on each of the blades, in which a set value indicating that wind received by the wind turbine generator has a biased wind speed distribution is set in advance in the pitch angle control part; when the load measured by the measurement part or a value based on the load is equal to or smaller than the set value, the pitch angle control part outputs the command value corresponding to the load, within predetermined limit values; and, only when the load or the value based on the load exceeds the set value, the pitch angle control part outputs the command value corresponding to the load, beyond the limit values.

According to the present invention, the wind turbine generator generates power through rotation of the rotor coupled to a plurality of blades whose pitch angles can be independently controlled. The wind turbine generator includes the pitch angle control part for outputting a command value that indicates the amount of change in the pitch angle of each blade, the actuators each of which changes the pitch angle of the corresponding blade based on the corresponding command value output from the pitch angle control part, and the measurement part for measuring a load imposed on each of the blade.

The load imposed on each blade measured by the measurement part is a moment or a blade-root load imposed on the root of the blade, for example. Note that, since loads are imposed on the roots of the blades when the blades receive wind, it is necessary to reduce the loads to protect equipment, such as a nacelle bedplate, a front frame, and the blades, for example.

In order to prevent a higher load than necessary from being imposed on a drive unit for the pitch angle, limit values are set on the command value, which indicates the amount of change in the pitch angle.

In the pitch angle control part, a set value indicating that wind received by the wind turbine generator has a biased wind speed distribution is set in advance; when the load measured by the measurement part or the value based on the load is equal to or smaller than the set value, the pitch angle control part outputs a command value corresponding to the load, within predetermined limit values; and, only when the load or the value based on the load exceeds the set value, the pitch angle control part outputs a command value corresponding to the load, beyond the limit values.

Note that the value based on the load is, for example, a value of one of the loads of the blades frame-converted from three axes to two axes when the wind turbine generator is provided with three blades, a command value that is calculated based on the load by the pitch angle control part, or the difference in load between different blades. Thus, the set value differs correspondingly to the load, to the value obtained when the load is subjected to frame conversion, to the command value calculated based on the load by the pitch angle control part, or to the difference in load between different blades.

Therefore, according to the present invention, while the limit values are being set for the amount of change in each pitch angle, a higher load than necessary is not imposed on the drive unit for the pitch angle of each blade in a case of a normal wind speed (for example, rated wind speed) or less or wind speed distribution caused by the normal wind speed, and the load imposed on the blade can be sufficiently reduced even in a case of a wind speed distribution that occurs when a strong wind (for example, wind having a speed higher than the rated wind speed) is received.

In the above-described configuration, it is preferable that, only when the load measured by the measurement part or the value based on the load exceeds the set value, the pitch angle control part output the command value beyond the limit values by easing the limit values.

Thus, a higher load than necessary is not imposed on the drive unit for the pitch angle of each blade, and the load imposed on the blade can be sufficiently reduced with ease even in a case of a wind speed distribution that occurs when a strong wind is received.

In the above-described configuration, is preferable that, only when the load measured by the measurement part or the value based on the load exceeds the set value, the pitch angle control part output the command value beyond the limit values accumulating a gain corresponding to the load or the value based on the load to the command value.

In the above-described configuration, it is preferable that, only when the load measured by the measurement part or the value based on the load exceeds the set value, the pitch angle control part cutout the command value beyond the limit values by adding to the command value an increment in the amount of change in the pitch angle, the increment corresponding to the difference between the load or the value based on the load, and the set value.

In the above-described configuration, the actuators change the pitch angles with hydraulic pressure.

In this case, even when the actuators are operated with hydraulic pressure, a command value indicating the amount of change in the pitch angle is output beyond the limit values only when the load imposed on the blade exceeds the set value; therefore, the temperature of the hydraulic oil is not increased, and the load imposed on the blade can be sufficiently reduced even in a case of a wind speed distribution that occurs when a strong wind is received.

Furthermore, according to the present invention, there is provided a wind turbine generator including: a plurality of blades whose pitch angles can be independently controlled; and the blade pitch control system described above.

Furthermore, according to the present invention, there is provided a blade pitch control method for a wind turbine generator that generates power through rotation of a rotor coupled to a plurality of blades independently and includes pitch angle control part for outputting a command value that indicates the amount of change in each of the pitch angles, actuators each of which changes the corresponding pitch angle based on the corresponding command value output from the pitch angle control part, and measurement part for measuring a load imposed on each of the blades, the blade pitch control method including: setting in advance a set value indicating that wind received by the wind turbine generator has a biased wind speed distribution; when the load measured by the measurement part or a value based on the load is equal to or smaller than the set value, outputting the command value corresponding to the load, within predetermined limit values; and, only when the load or the value based on the load exceeds the set value, outputting the command value corresponding to the load, beyond the limit values.

Advantageous Effects of Invention

According to the present invention, a beneficial effect is afforded in which a higher load than necessary is not imposed on the drive unit for the pitch angle of each blade in the case of a normal wind speed or a wind speed distribution caused by the normal wind speed, and the load imposed on the blade can be sufficiently reduced even in the case of a wind speed distribution that occurs when a strong wind is received.

BRIEF DESCRIPTION OF DRAWINGS

FIG. 4A shows the distribution of wind with respect to the wind turbine generator in a case where a positive d-axis load is imposed, FIG. 4B shows the distribution of wind with respect to the wind turbine generator in a case where a negative d-axis load is imposed, and FIG. 4C shows the distribution of wind with respect to the wind turbine generator in a case where a positive q-axis load is imposed.

DESCRIPTION OF EMBODIMENTS

First Embodiment

A first embodiment of the present invention will be described below.

Figure 1:
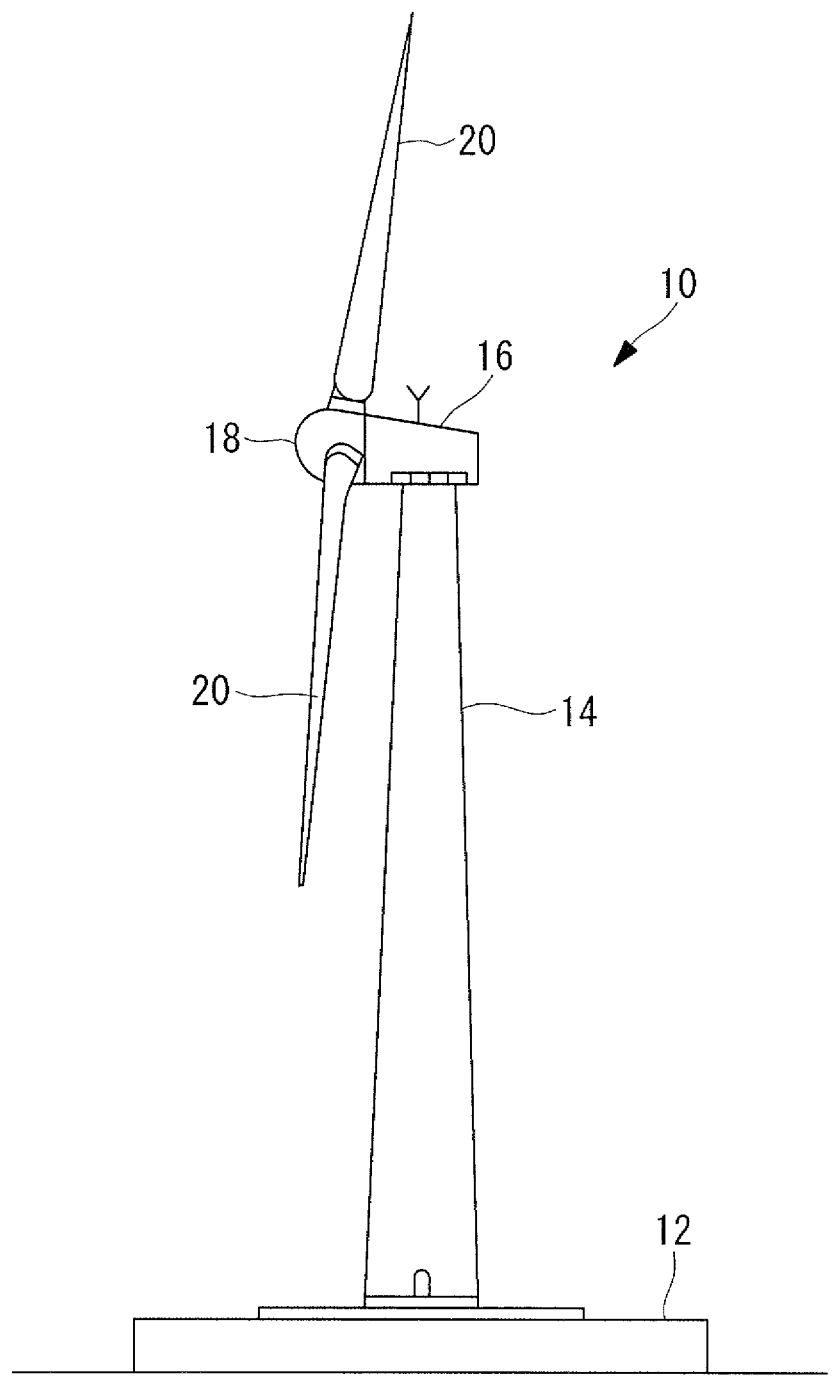
FIG. 1 is an external view of a wind turbine generator according to a first embodiment of the present invention.

FIG. 1 is an external view of a wind turbine generator 10 according to the first embodiment.

The wind turbine generator 10 shown in FIG. 1 has a tower 14 provided upright on a foundation 12, a nacelle 16 provided on the top of the tower 14, and a rotor 18 provided on the nacelle 16 so as to be able to rotate about a substantially-horizontal axis.

A plurality of (in the first embodiment, three) blades 20 are attached to the rotor 18 radially from the rotational axis of the rotor 18. With this structure, the force of wind striking against the blades 20 from the direction of the rotational axis of the rotor 18 is converted to mechanical power for rotating the rotor 18 about the rotational axis, and the mechanical power is converted to electric power by a generator (not shown). Note that the blades 20 are coupled to the rotor 18 so as to be able to rotate with respect to the wind direction, and the pitch angles of the blades 20 can be independently controlled.

Figure 2:
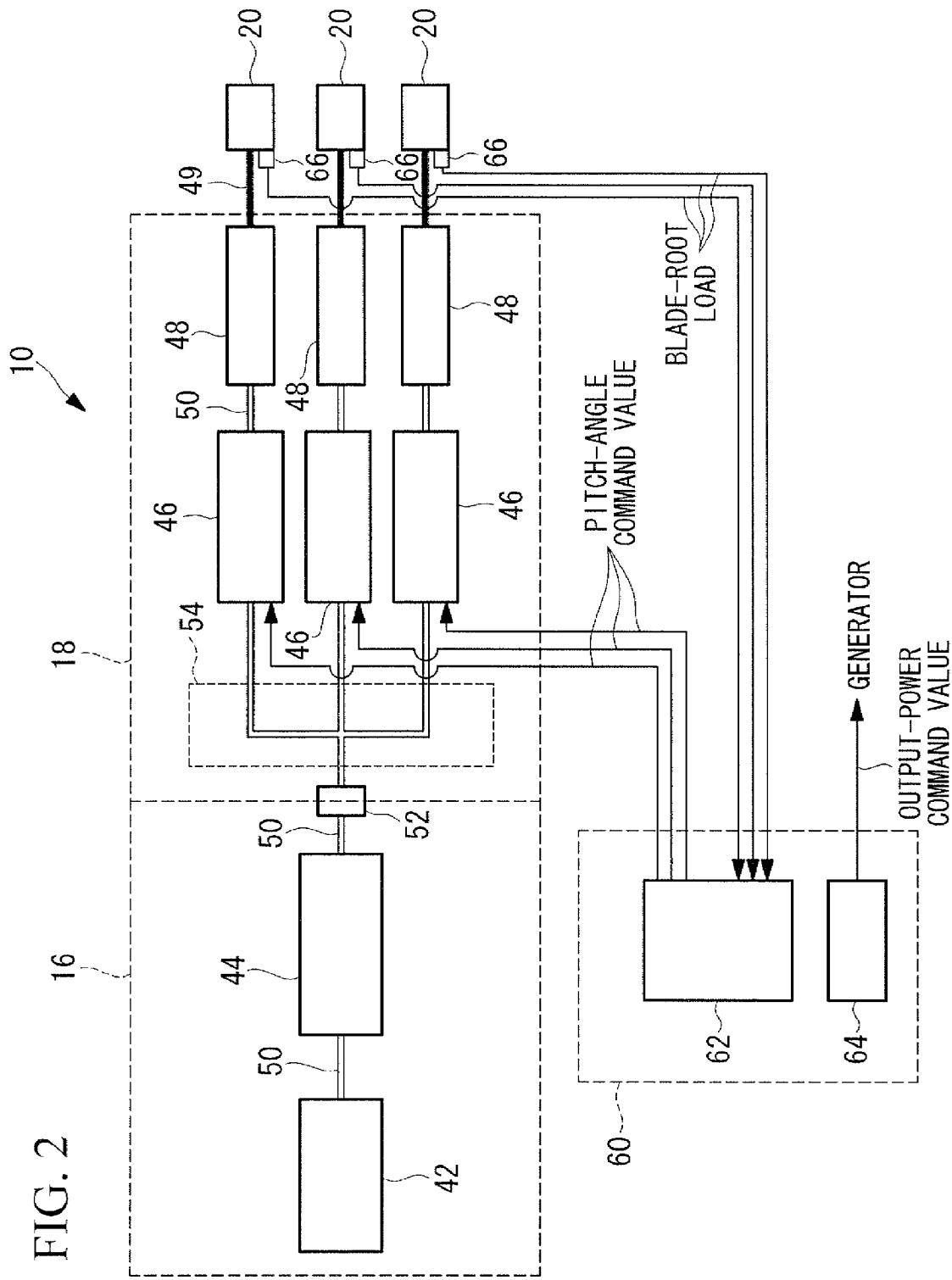
FIG. 2 is a block diagram showing a configuration used for control of the pitch angles of blades according to the first embodiment of the present invention.

FIG. 2 is a block diagram showing a configuration used for control of the pitch angles of the blades 20 according to the first embodiment. Note that, in the wind turbine generator 10 of the first embodiment, hydraulic pressure is used, as an example, to individually control the pitch angles of the blades 20.

The nacelle 16 includes an oil tank 42 and a hydraulic pump 44. The rotor 18 includes electromagnetic-proportional-direction flow control valves 46 and hydraulic cylinders 48 for the respective blades 20 such that the pitch angles of the blades 20 can be independently controlled. The oil tank 42, the hydraulic pump 44, the electromagnetic-proportional-direction flow control valves 46, and the hydraulic cylinders 48 are connected by hydraulic pipes 50.

Hydraulic oil is stored in the oil tank 42. The hydraulic oil is sucked and is raised in pressure by the hydraulic pump 44 and is supplied to the electromagnetic-proportional-direction flow control valves 46 and the hydraulic cylinders 48, which are provided for the respective blades 20, through the hydraulic pipes 50 via a rotary joint 52 and a distribution block 54.

The rotary joint 52 ins the hydraulic pipe 50 that is provided at the nacelle 16 (fixed part) side and the hydraulic pipe 50 that is provided at the rotor 18 (rotating part) side. The distribution block 54 distributes the hydraulic oil to the respective electromagnetic-proportional-direction flow control valves 46.

The wind turbine generator 10 further includes a main control section 60 that controls the entire wind turbine generator 10. The main control section 60 includes a pitch-angle control section 62 that generates a pitch-angle command value to control the pitch angle of each blade 20 and a generator output-power control section 64 that generates an output-power command value to control the output power of the generator. Note that, for example, the pitch-angle control section 62 is provided in the rotor 18, and the generator output-power control section 64 is provided in the nacelle 16.

The pitch-angle control section 62 sends to each of the electromagnetic-proportional-direction flow control valves 46 a pitch-angle command value for the corresponding blade 20. Then, in order to change the pitch angle of the blade 20 according to the receive pitch-angle command value, the electromagnetic-proportional-direction flow control valve 46 controls the flow rate of hydraulic oil to be supplied to the corresponding hydraulic cylinder 48.

The hydraulic cylinder 48 is coupled to the blade 20 and is driven to change the pitch angle of the blade 20. The hydraulic oil supplied to the hydraulic cylinder 48 presses a piston toward either the right or left according to the hydraulic flow path and flow rate specified by the electromagnetic-proportional-direction flow control valve 46. As a result, the blade 20 coupled to a piston rod 49 of the hydraulic cylinder 48 turns according to the direction of the movement of the piston and is controlled so as to have the pitch angle corresponding to the pitch-angle command value.

Further, the wind turbine generator 10 of the first embodiment includes load measurement sections 66 (for example, part for performing load measurement through strain measurement using an optical fiber sensor) each of which measures the magnitude of a load imposed on the corresponding blade 20 (as an example, the load imposed on the root of the blade 20; hereinafter, the load is referred to as "blade-root load"). The blade-root load of each blade 20 measured by the corresponding load measurement section 66 is sent to the pitch-angle control section 62. The pitch-angle control section 62 generates a pitch-angle command value by using the received blade-root load of each blade 20, as described later.

Note that the wind turbine generator 10 of the first embodiment is capable of executing independent, pitch control. The independent pitch control is to reduce the blade-root load and a fluctuation of the blade-root load, through the pitching operation of each blade 20 performed in consideration of the wind direction and the wind speed distribution (wind shear) on the entire rotor surface, with respect to the wind turbine generator 10.

The wind speed distribution is expressed by a logarithmic law, and the wind speed is generally higher in the upper region than on the ground. Thus, the blade-root load imposed on the blade 20, when it is rotating, changes periodically depending on a rotational position while the rotor 18 rotates one revolution, and the largest blade-root load is imposed on the blade 20 when it passes through the apex of the wind turbine generator 10.

Figure 3:
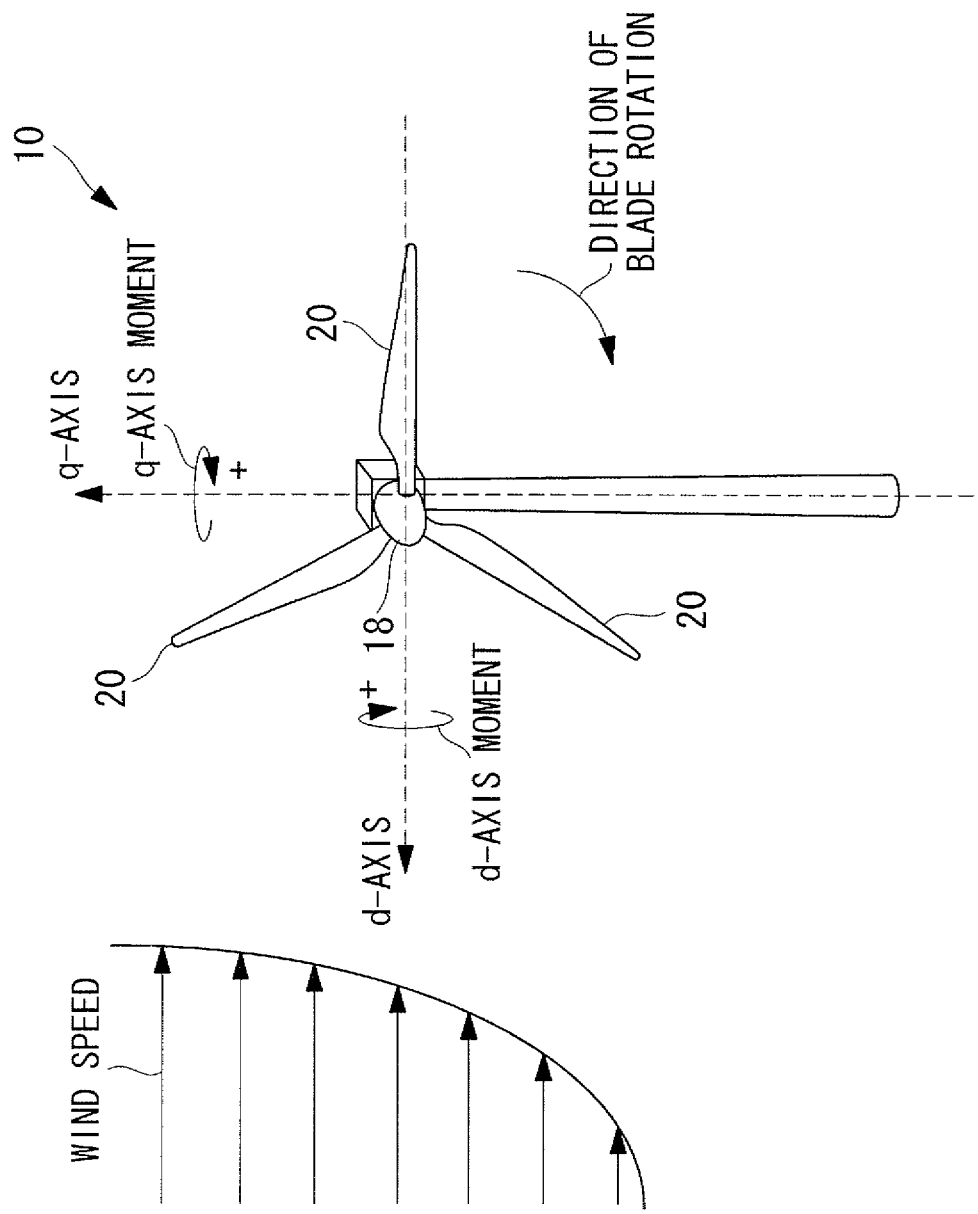
FIG. 3 is a schematic diagram showing the definitions of a d-axis and a q-axis in a stationary coordinate system with respect to the wind turbine generator according to the first embodiment of the present invention.

Furthermore, the entire rotor surface does not receive a uniform wind speed, and the blade-root load imposed on each blade 20 changes depending on the wind direction. Thus, three blade-root loads of the blades 20 measured by the load measurement sections 66 are converted from a rotating coordinate system to a stationary coordinate system and are further converted from three axes to two axes, thereby expressing the wind energy received on the entire rotor surface of the wind turbine generator 10 in two axes (a d-axis and a q-axis) of the stationary coordinate system, as shown in FIG. 3. Note that the d-axis and the q-axis indicate the planes perpendicular to the rotational axis of the blades 20, and, for example, an axis that is substantially parallel to the tower 14 is the q-axis, and an axis that is perpendicular to the q-axis is the d-axis.

Then, in the wind turbine generator 10 of the first embodiment, pitch-angle command values for reducing the blade-root loads are generated individually for the blades 20 through the independent pitch control.

Note that an upper limit and a lower limit (hereinafter, referred to as "pitch command limit values") are specified for the pitch-angle command value generated through the independent pitch control. The pitch command limit values vary according to the output power of the generator or a collective pitch angle (the same pitch angle by which the pitch angles of the blades 20 are simultaneously changed in order to maintain the rotation of the rotor 18 at the rated rotor speed).

Figure 4:
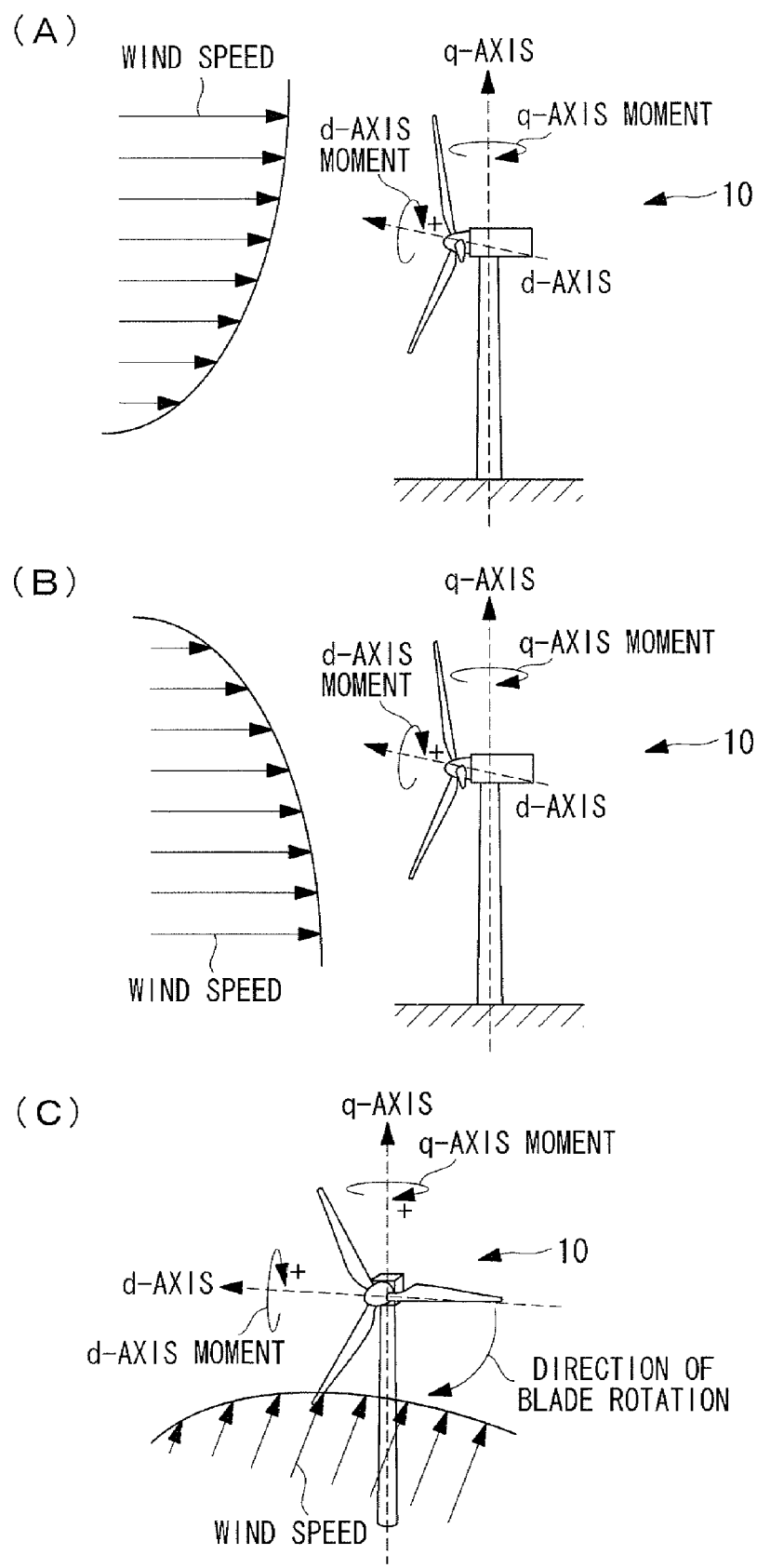
FIGS. 4A to 4C are schematic diagrams showing various states of wind received by the wind turbine generator according to the first embodiment of the present invention.

FIGS. 4A to 4C show various states of wind received by the wind turbine generator 10, based on the logarithmic law. Note that, in FIGS. 4A to 4C, the wind speed indicated by an arrow is higher as the length of the arrow is longer.

FIG. 4A shows the distribution of wind with respect to the wind turbine generator 10 in a case where a positive d-axis load (in the direction of an arrow around the d-axis, that is, clockwise in the horizontal direction, specifically, in a direction in which the wind attempts to fall down the wind turbine generator 10 backward) is imposed. FIG. 4B shows the distribution of wind with respect to the wind turbine generator 10 in a case where a negative d-axis load (in the direction opposite to that of the arrow around the d-axis, specifically, in a direction in which the wind attempts to fall down the wind turbine generator 10 forward) is imposed.

FIG. 4C shows the distribution of wind with respect to the wind turbine generator 10 in a case where a positive q-axis load (in the direction of an arrow around the q-axis, that is, clockwise in the vertical direction) is imposed.

Note that the d-axis load is likely to occur at the positive side due to the logarithmic law of the wind speed, and the q-axis load is likely to occur at the negative side due to the position where the rotor 18 is mounted or for some other reason.

The pitch command limit values are specified by taking account of the above-described tendencies of the d-axis load and the q-axis load. For example, the pitch command limit values may differ in the positive direction of the d-axis load, the negative direction of the d-axis load, the positive direction of the q-axis load, and the negative direction of the q-axis load; or they may be the same in the negative direction and the positive direction of each axis but differ for the d-axis and the q-axis.

However, when an extreme wind shear is imposed in the horizontal direction or the vertical direction of the wind turbine generator 10, even if the wind turbine generator 10 executes the independent pitch control, the pitch-angle command value is limited in magnitude by the pitch command limit values, and a sufficient load reduction effect is not obtained, in some cases.

Then, if the range of the pitch command limit values is broadened in order to obtain a sufficient load reduction effect, the pitch of each blade 20 is always driven in the broadened fluctuation range, and a higher load than necessary may be imposed on a drive unit for the pitch angle, which is not preferable. In particular, when the pitch angle is controlled by the pressure of hydraulic oil, as in the wind turbine generator 10 of the first embodiment, the temperature of the hydraulic oil may be excessively increased to exceed a permissible value, in some cases.

Thus, when the independent pitch control is executed, if the blade-root load is equal to or lower than a predetermined set value, the pitch-angle control section 62 of the first embodiment outputs a pitch-angle command value corresponding to the blade-root load, within the pitch command limit values, and, if the blade-root load exceeds the above-described set value, it outputs a pitch-angle command value corresponding to the blade-root load, beyond the pitch command limit values.

Figure 5:
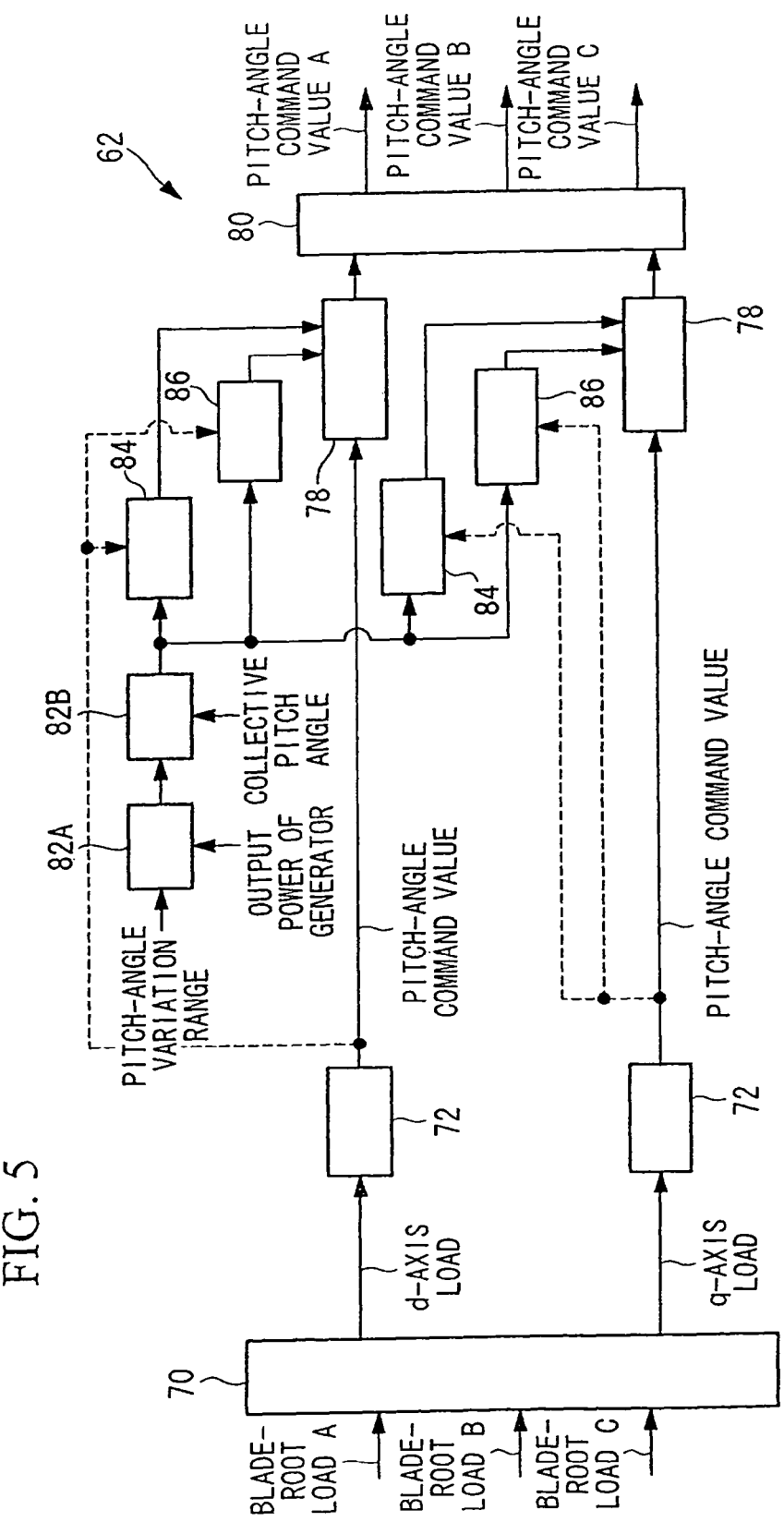
FIG. 5 is a block diagram showing the electrical configuration of a pitch-angle control section according to the first embodiment of the present invention.

FIG. 5 is a block diagram showing the electrical configuration of the pitch-angle control section 62 of the first embodiment.

The pitch-angle control section 62 includes a three-axis-to-two-axis conversion section 70, pitch-angle command value calculation sections 72, pitch-angle limiting sections 78, and a two-axis-to-three-axis conversion section 80.

The three-axis-to-two-axis conversion section 70 receives the blade-root loads of the blades 20 (blade-root loads A, B, and C) measured by the load measurement sections 66 and converts the blade-root loads A, B, and C to a d-axis load and a q-axis load in the stationary coordinate system, which is indicated by the above-described d-axis and q-axis.

The d-axis load and the q-axis load obtained after the conversion of the three-axis-to-two-axis conversion section 70 are output to the corresponding pitch-angle command value calculation sections 72.

Based on the received d-axis load or q-axis load, each of the pitch-angle command value calculation sections 72 generates a pitch-angle command value for the d-axis load or the q-axis load by using a control algorithm (for example, PI control) for reducing the blade-root load.

Each of the pitch-angle limiting sections 78 limits the pitch-angle command value received from the corresponding pitch-angle command value calculation section 72 by received pitch command limit values and outputs the pitch-angle command value to the two-axis-to-three-axis conversion section 80.

Here, the pitch command limit values are determined by a limit-value calculating section 82A that calculates pitch command limit values based on the output power of the generator and by a limit-value calculating section 82B that calculates pitch command limit values based on the collective pitch angle, on the basis of a predetermined pitch-angle variation range.

Then, the pitch command limit values determined by the limit-value calculating sections 82A and 82B are output to the pitch-angle limiting sections 78.

Note that the upper limit and the lower limit are specified in the pitch command limit values, as described above. The upper limit is the maximum value when the pitch angle is changed in the positive directions of the d-axis and the q-axis. On the other hand, the lower limit is the maximum value when the pitch angle is changed in the negative directions of the d-axis and the q-axis.

The two-axis-to-three-axis conversion section 80 converts the received pitch-angle command values to pitch-angle command values A, B, and C for the respective blades 20 and outputs the pitch-angle command values A, B, and C.

Then, the pitch-angle control, section 62 outputs the pitch-angle command values A, B, and C calculated based on the d-axis load and the q-axis load, to the corresponding electromagnetic-proportional-direction flow control valves 46.

Furthermore, the pitch-angle control section 62 of the first embodiment includes maximum value easing sections 84 and minimum value easing sections 86 in order to output a pitch-angle command value corresponding to the blade-root load, beyond the pitch command limit values. Note that a set value indicating that wind received by the wind turbine generator 10 has a biased wind speed distribution is set in advance in the maximum-value easing sections 84 and the minimum-value easing sections 86.

The pitch-angle command value generated by each of the pitch-angle command value calculation sections 72 is sent to the corresponding maximum-value easing section 84 and the corresponding minimum-value easing section 86. The maximum-value easing section 84 and the minimum-value easing section 86 determine whether the received pitch-angle command value is equal to or smaller than the above-described set value.

The maximum-value easing section 84 and the minimum-value easing section 86 ease the pitch command limit values received from the limit-value calculating section 82B, only when the pitch-angle command value exceeds the set value. Specifically, the maximum-value easing section 84 eases she upper limit of the pitch command limit values when the pitch-angle command value exceeds a positive set value, and the minimum-value easing section 86 eases the lower limit of the pitch command limit values only when the pitch-angle command value exceeds a negative set value. The set value may differ in each of the positive direction of the d-axis, the negative direction of the d-axis, the positive direction of the q-axis, and the negative direction of the q-axis, or may be the same in all or part of them.

Note that easing of the pitch command limit values means that neither an upper limit nor a lower limit is provided the pitch command limit values, specifically, that the pitch-angle command value is not limited, or that the upper limit and the lower limit of the pitch command limit values are extended to another upper limit and another lower limit that are set in advance.

Next, a description will be given of a result obtained through simulations in a case were pitch-angle command values are generated through conventional independent pitch control and in a case where pitch-angle command values are generated through the independent pitch control of the first embodiment.

Figure 6:
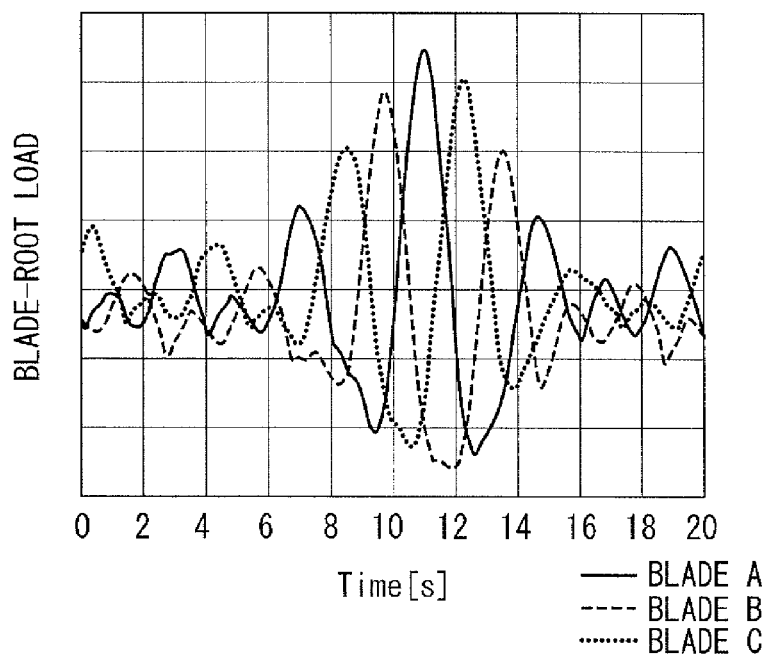
FIG. 6A shows changes over time of three-axis blade-root loads when conventional independent pitch control is executed.
FIG. 6B shows changes over time of three-axis blade-root loads when independent pitch control of the first embodiment is executed.
Figure 6:
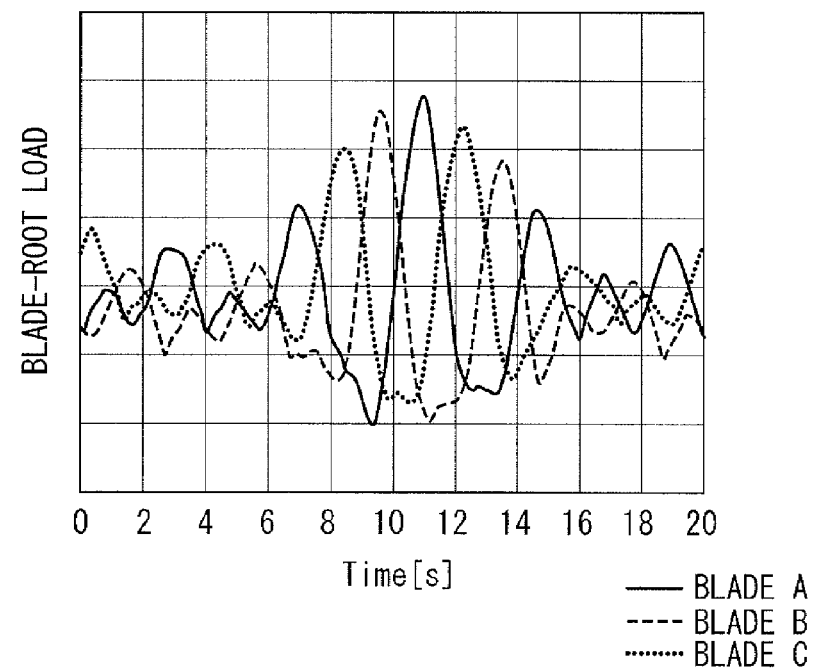

FIG. 6A shows changes over time of the three-axis blade-root loads A, B, and C when the conventional independent pitch control is executed. FIG. 6B shows changes over time of the three-axis blade-root loads A, B, and C when the independent pitch control of the first embodiment is executed. FIGS. 6A and 6B both show that the blade-root loads A, B, and C are increased during the period from about 7 to 15 seconds.

Figure 7:
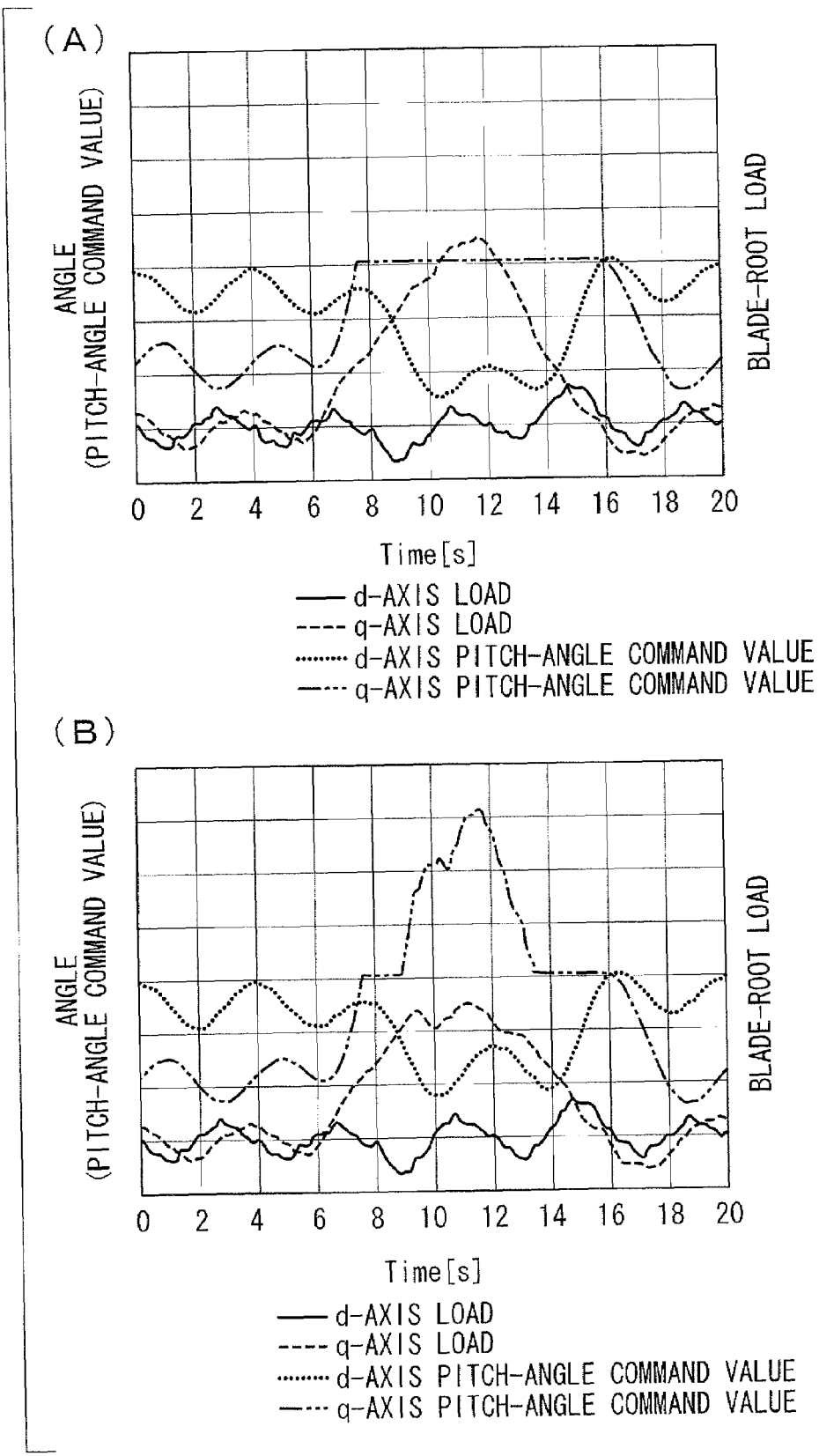
FIG. 7A shows pitch-angle command values for the d-axis and the q-axis when the conventional independent pitch control is executed.
FIG. 7B shows pitch-angle command values for the d-axis and the q-axis when the independent pitch control of the first embodiment is executed.

FIGS. 7A and 7B correspond to the changes over time of the blade-root loads shown in FIGS. 6A and 6B and show the blade-root loads converted to the two axes (the d-axis and the q-axis), and the pitch-angle command values for the d-axis and the q-axis.

In the conventional independent pitch control shown in FIG. 7A, a situation occurs in which the blade-root load of the q-axis becomes excessive, and the calculated pitch-angle command value for the q-axis exceeds the pitch command limit values, accordingly. Then, the pitch-angle command value exceeding the pitch command limit values is limited by the upper limit of the pitch command limit values (during the period from about 7 to 16 seconds).

On the other hand, in the independent pitch control of the first embodiment shown in FIG. 7B, only when the blade-root load of the q-axis becomes excessive, and the pitch-angle command value exceeds the set value (during the period from about 9 to 13 seconds), a pitch-angle command value is output beyond the pitch command limit values. Then, when the pitch-angle command value for the q-axis does not, exceed the set value, the pitch-angle command value is again limited by the pitch commend limit values.

Figure 8:
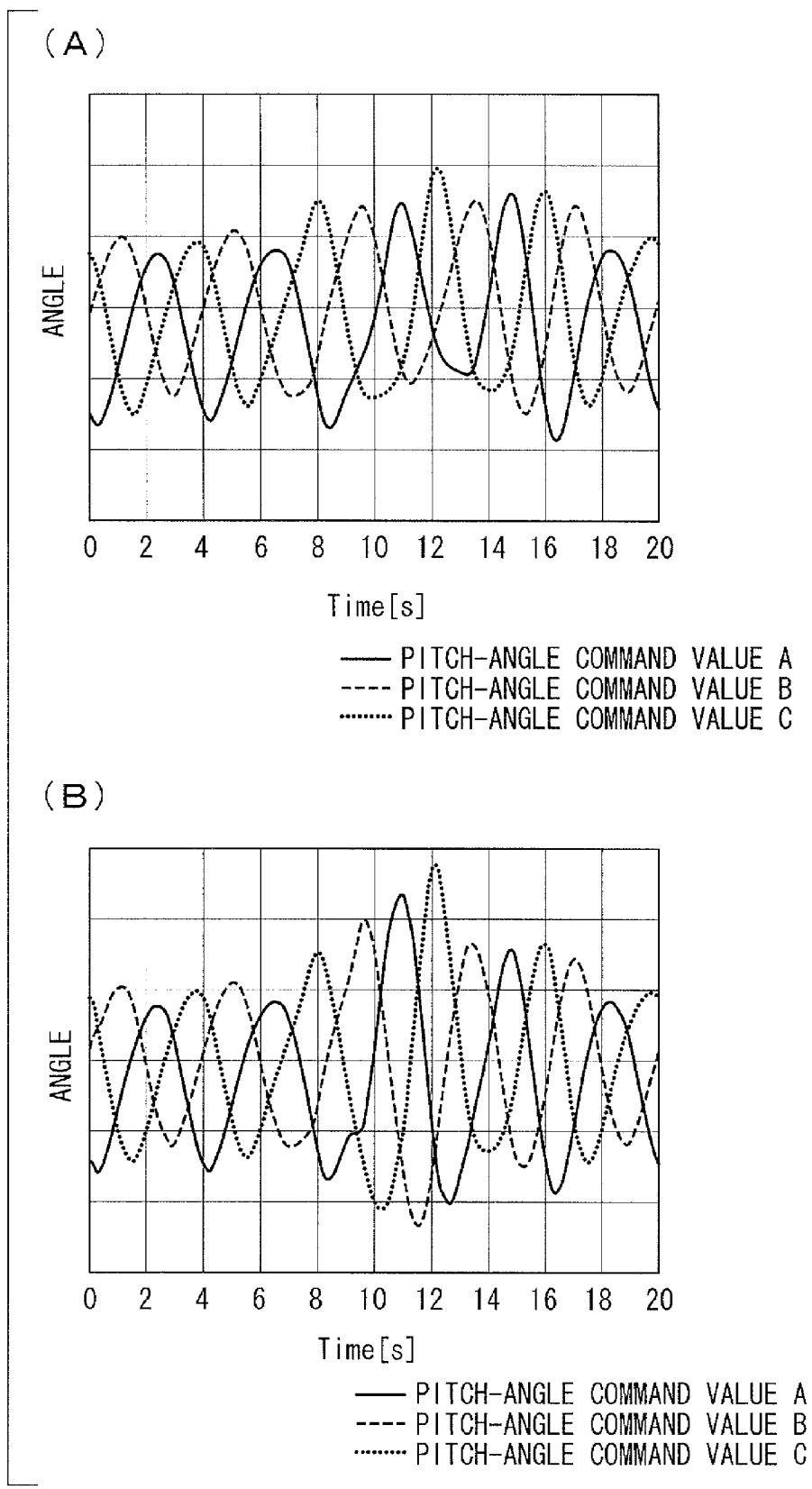
FIG. 8A shows three-axis pitch-angle command values when the conventional independent pitch control is executed.
FIG. 8B shows three-axis pitch-angle command values when the independent pitch control of the first embodiment is executed.

FIGS. 8A and 8B show three-axis pitch-angle command values A, B, and C calculated based on the pitch-angle command values for the d-axis and the q-axis shown in FIGS. 7A and 7B. FIG. 8A shows three-axis pitch-angle command values A, B, and C obtained when the conventional independent pitch control is executed, and FIG. 8B shows three-axis pitch-angle command values A, B, and C obtained when the independent pitch control of the first embodiment is executed.

As shown in FIG. 8B, the pitch-angle command values A, B, and C obtained when the independent pitch control of the first embodiment is executed indicate angles larger than the pitch-angle command values A, B, and C obtained when the conventional independent pitch control is executed, shown in FIG. 8A.

Thus, in the wind turbine generator 10 of the first embodiment, a wind speed distribution that was not reduced in conventional wind turbine generators can also be handled.

As described above, the wind turbine generator 10 of the first embodiment generates power through rotation of the rotor 18 coupled to a plurality of blades 20 whose pitch angles can be controlled and includes the pitch-angle control section 62 that outputs a pitch-angle command value indicating the amount of change in the pitch angle of each blade 20, the hydraulic cylinders 48 each of which changes the pitch angle of the corresponding blade 20 based on the corresponding pitch-angle command value output from the pitch-angle control section 62, and the load measurement sections 66 each of which measures the corresponding blade-root load. In the pitch-angle control section 62, a set value indicating that wind received by the wind turbine generator 10 has a biased wind speed distribution is set in advance, and, when a calculated pitch-angle command value is equal to or smaller than the set value, a pitch-angle command value is output within the pitch command limit values, and, only when a calculated pitch-angle command value exceeds the set value, a pitch-angle command value corresponding to the corresponding blade-root load is output beyond the pitch command limit values.

Thus, in the wind turbine generator 10 of the first embodiment, a higher load than necessary is not imposed on the drive unit for the pitch angle of each blade 20 in a case of a normal wind speed or a wind speed distribution caused by the normal wind speed, and the blade-root load can be sufficiently reduced even in a case of a wind speed distribution that occurs when a strong wind is received.

Furthermore, in the wind turbine generator 10 of the first embodiment, the pitch command limit values are eased only when the pitch-angle command value exceeds the set value.

Furthermore, in the wind turbine generator 10 of the first embodiment, although each pitch angle is changed with hydraulic pressure, only when the blade-root load exceeds the set value, a pitch-angle command value is output beyond the pitch command limit values; therefore, it is possible to sufficiently reduce the blade-root load even in a case of a wind speed distribution that occurs when a strong wind is received, without increasing the temperature of the hydraulic oil.

Note that the pitch-angle control section 62 of the first embodiment may detect the temperature of hydraulic oil and may stop easing the pitch command limit values when the independent pitch control is executed and the temperature of the hydraulic oil exceeds a predetermined value.

Second Embodiment

A second embodiment of the present invention will be described below.

Since the configuration of a wind turbine generator 10 according to the second embodiment is the same as that of the wind turbine generator 10 of the first embodiment, shown in FIGS. 1 and 2, a description thereof will be omitted.

In the wind turbine generator 10 of the second embodiment, only when a pitch-angle command value generated by each of the pitch-angle command value calculation sections 72 exceeds the set value, a gain corresponding to the generated pitch-angle command value is accumulated to the pitch-angle command value limited in the corresponding pitch-angle limiting section 78, thereby outputting a pitch-angle command value beyond the pitch command limit values.

Figure 9:
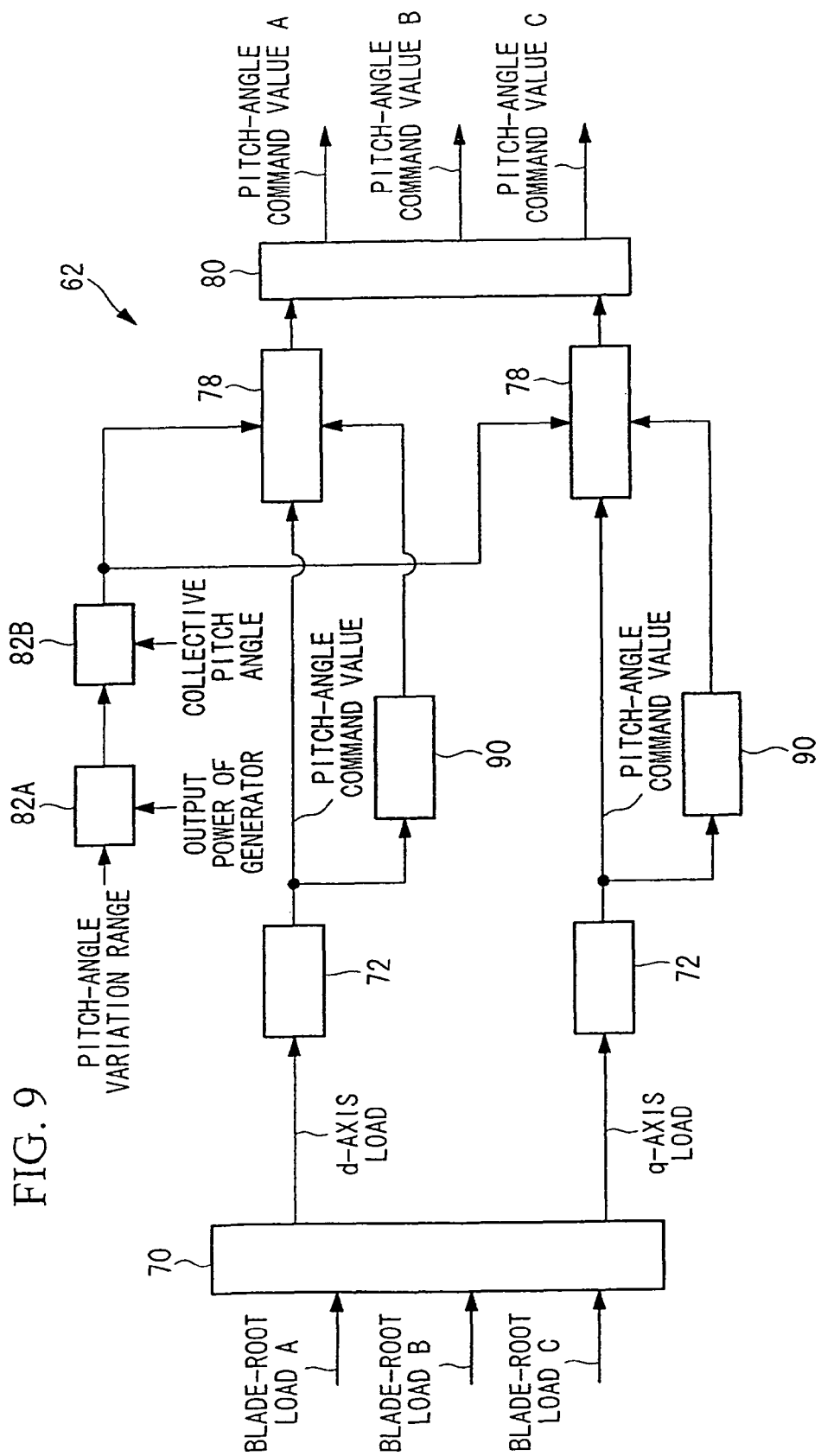
FIG. 9 is a block diagram showing the electrical configuration of a pitch-angle control section according to a second embodiment of the present invention.

FIG. 9 is a block diagram showing the electrical configuration of a pitch-angle control section 62 of the second embodiment. Note that the same reference symbols as those in FIG. 5 are assigned to the same components in FIG. 9 as those in FIG. 5, and a description thereof will be omitted.

The pitch-angle control section 62 of the second embodiment includes gain output sections 90 each of which receives the pitch-angle command value generated by the corresponding pitch-angle command value calculation section 72. Note that the pitch-angle control section 62 of the second embodiment does not include the maximum-value easing sections 84 and the minimum-value easing sections 86, which are included in the pitch-angle control section 62 of the first embodiment.

Figure 10:
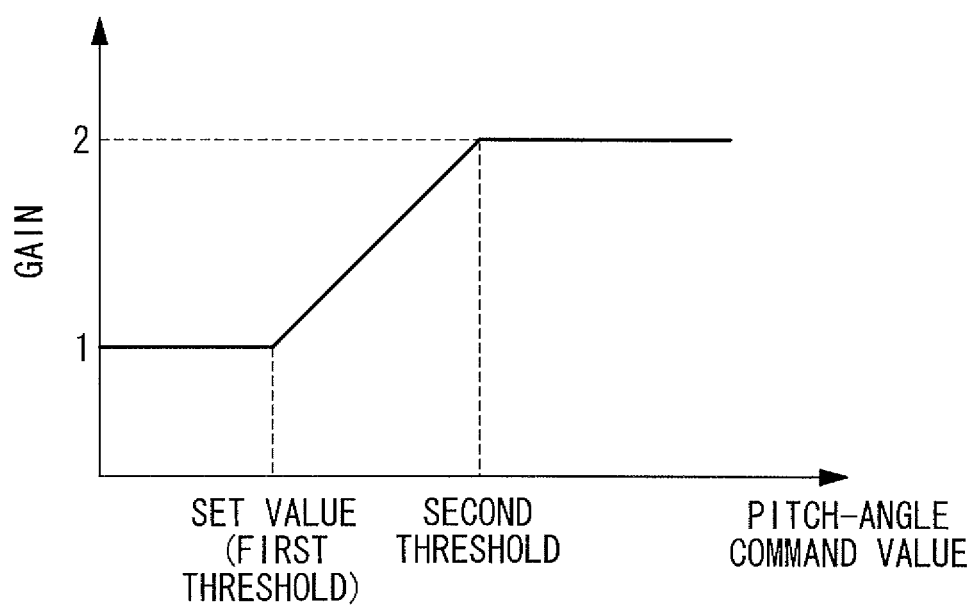
FIG. 10 is a graph showing a gain corresponding to a pitch-angle command value according to the second embodiment of the present invention.

In each of the gain output sections 90, a set value indicating the wind received by the wind turbine generator 10 has a biased wind speed distribution is set in advance. When the received pitch-angle command value exceeds the above-described set value, each gain output section 90 outputs a gain corresponding to the pitch-angle command value, as shown in FIG. 10. Note that, for example, when the set value is a first threshold, if the pitch-angle command value exceeds the set value, the gain output section 90 outputs a gain of 1 or more corresponding to the pitch-angle command value; however, if the pitch-angle command value exceeds a second threshold, the gain output section 90 makes the gain constant (at 2 in the example shown in FIG. 10) without increasing the gain correspondingly to the pitch-angle command value.

For example, a gain specified correspondingly to the pitch-angle command value, such as that shown in FIG. 10, may be determined in advance in a look-up table or may be calculated correspondingly to the pitch-angle command value by using a predetermined arithmetic expression.

Then, the gain output section 90 outputs the gain to the corresponding pitch-angle limiting section 78. When the gain is received from the gain output section 90, the pitch-angle limiting section 78 does not limit the pitch-angle command value by the pitch command limit values, but it multiplies the pitch-angle command value by the received gain and outputs a result to the two-axis-to-three-axis conversion section 80.

Therefore, in the wind turbine generator 10 of the second embodiment, a higher load than necessary is not imposed on the drive unit for the pitch angle of each blade 20, and the blade-root load imposed on each blade 20 can be easily reduced even when a strong wind is received.

Third Embodiment

A third embodiment of the present invention will be described below.

Since the configuration of a wind turbine generator 10 according to the third embodiment is the same as that of the wind turbine generator 10 of the first embodiment, shown in FIGS. 1 and 2, a description thereof will be omitted.

In the wind turbine generator 10 of the third embodiment, only when the pitch-angle command value exceeds the set value, an increment in the amount of change in the pitch angle, the increment corresponding to the difference between the pitch angle command value and the set value, is added to the pitch angle command value, thereby outputting the pitch-angle command value beyond the pitch command limit values.

Figure 11:
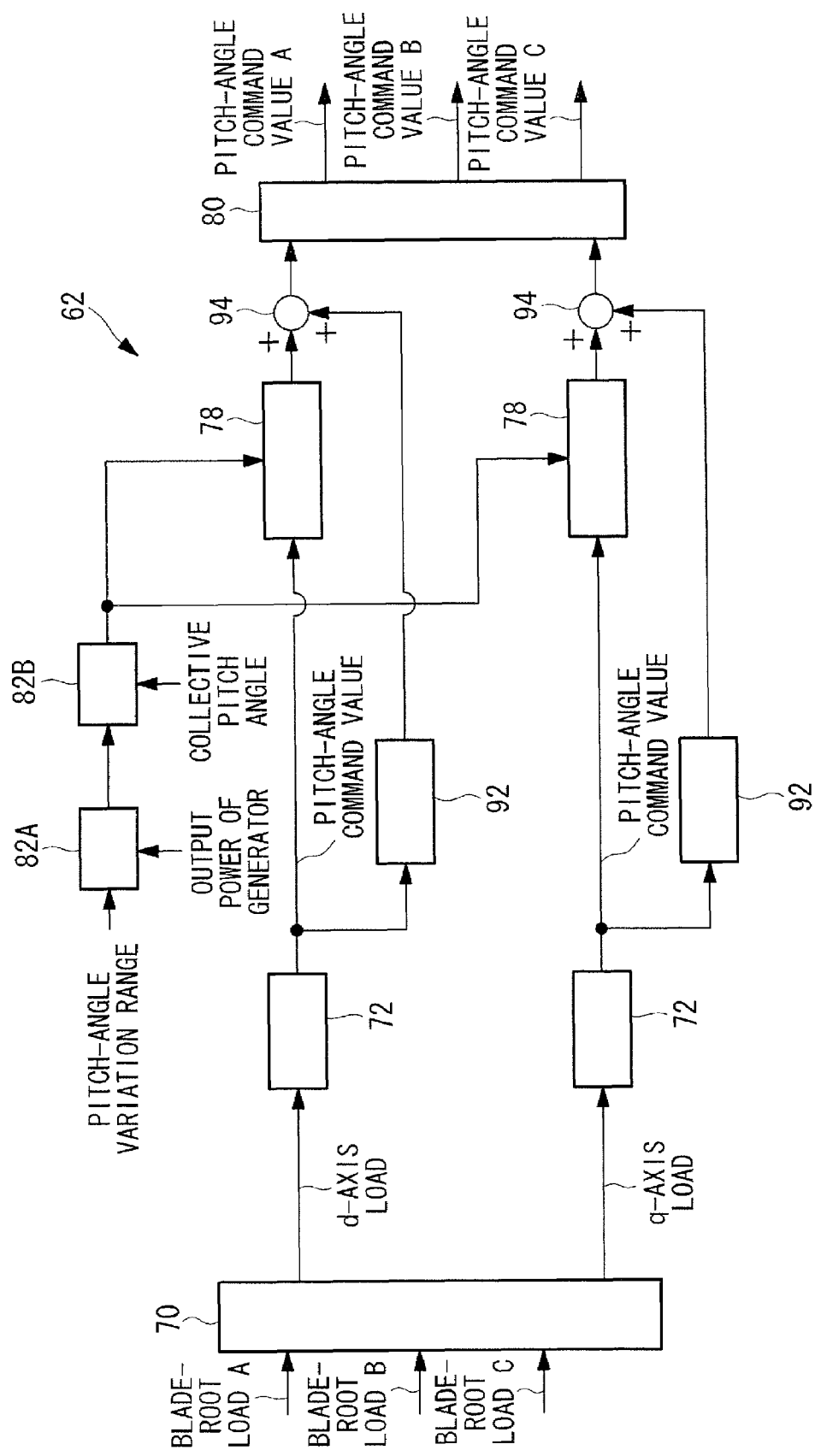
FIG. 11 is a block diagram showing the electrical configuration of a pitch-angle control section according to a third embodiment of the present invention.

FIG. 11 is a block diagram showing the electrical configuration of a pitch-angle control section 62 of the third embodiment. Note that the same reference symbols as those in FIG. 5 are assigned to the same components in FIG. 11 as those in FIG. 5, and a description thereof will be omitted.

The pitch-angle control section 62 of the third embodiment includes increment calculation sections 92 each of which receives a pitch-angle command value generated by the corresponding pitch-angle command value calculation section 72 and adders 94 that are disposed between the pitch-angle limiting sections 78 and the two-axis-to-three-axis conversion section 80. Note that the pitch-angle control section 62 of the third embodiment does not include the maximum-value easing sections 84 and the minimum-value easing sections 86, which are included in the pitch-angle control section 62 of the first embodiment.

In each of the increment calculation sections 92, a set value indicating that wind received by the wind turbine generator 10 has a biased wind steed distribution is set in advance. When the received pitch-angle command value exceeds the above-described set value, the increment calculation section 92 calculates an incremental value that is the difference between the pitch-angle command value and the set value and outputs the incremental value to the corresponding adder 94.

The adder 94 adds the incremental value received from the increment calculation section 92 to the pitch-angle command value received from the corresponding pitch-angle limiting section 78. Then, the adder 94 outputs to the two-axis-to-three-axis conversion section 80 the pitch-angle command value to which the incremental value has been added.

Specifically, in the pitch-angle control section 62 of the third embodiment, although the pitch-angle command value generated in each pitch-angle command value calculation section 72 is limited in the corresponding pitch-angle limiting section 78, when the pitch-angle command value exceeds the set value, an incremental value is calculated in the increment calculation section 92 and is added to the pitch-angle command value limited in the pitch-angle limiting section 78. Thus, the pitch-angle control section 62 of the third embodiment outputs a pitch-angle command vale corresponding to the blade-root load, beyond the pitch command limit values only when the pitch-angle command value exceeds the set value.

Therefore, in the wind turbine generator 10 of the third embodiment, a higher load than necessary is not imposed on the drive unit for the pitch angle of each blade 20, and the blade-root load imposed on each blade can be easily reduced even when a strong wind is received.

A description has been given of the present invention using the respective embodiments; however, the technical scope of the present invention is not limited to the scope described above in the embodiments. Various modifications or improvements can be added to the above-described embodiments without departing from the gist of the invention, and configurations in which the modifications or improvements are added are also encompassed in the technical scope of the present invention.

For example, in the above-described embodiments, a description has been given of a configuration in which the blade-root loads are measured as the loads imposed on the roots of the blades 20, and the blade-root loads are converted from three axes to two axes to calculate pitch-angle command values; however, the present invention is not limited thereto. For example, a configuration may be used in which moments are measured as the loads imposed on the roots of the blades 20, and the moments are converted from three axes to two axes to calculate pitch-angle command values. Alternatively, the loads or the moments imposed on the roots of the blades may be obtained not through measurement but through estimation from the rotational speed of the rotor 18, the torque of the generator, and the pitch angles of the blades 20.

Furthermore, in the above-described embodiments, a description has been given of a configuration in which, when the pitch-angle command value generated by the pitch-angle command value calculation section 72 exceeds the set value, which indicates that wind received by the wind turbine generator 10 has a biased wind speed distribution, a pitch-angle command value is output beyond the limit values; however, the present invention is not limited thereto.

For example, when a measured blade-root load itself exceeds a set value that is specified correspondingly to the blade-root load, a pitch-angle command value may be output beyond the limit values. Alternatively, when the difference in blade-root load between different blades 20 exceeds a set value that is specified correspondingly to this difference, pitch-angle command value may be output beyond the limit values.

Furthermore, in the above-described embodiments, a description has been given of a configuration in which the blade-root loads are converted from three axes to two axes to calculate pitch-angle command values; however, the present invention is not limited thereto, and a configuration may be used in which the three-axis blade-root loads are not converted to two axes and are used as they are to calculate pitch-angle command values.

Furthermore, in the above-described embodiments, a description has been given of a configuration in which the hydraulic cylinders are used as actuators for changing the pitch angles of the blades 20; however, the present invention is not limited thereto, and a configuration may be used in which electric motors are used as actuators for changing the pitch angles of the blades 20.

REFERENCE SIGNS LIST

10 wind turbine generator
20 blade
48 hydraulic cylinder
62 pitch-angle control section
66 load measurement section
84 maximum-value easing section
86 minimum-value easing section
90 gain output section
92 increment calculation section

The invention claimed is:

1. A blade pitch control system for a wind turbine generator that generates power through rotation of a rotor coupled to a plurality of blades whose pitch angles are independently controllable, the blade pitch control system comprising:
a pitch angle control part for generating and outputting a command value that indicates an amount of change in each of the pitch angles;
actuators each of which changes the corresponding pitch angle based on the corresponding command value output from the pitch angle control part; and
a measurement part for measuring a load imposed on each of the blades, wherein
a set value indicating that wind received by the wind turbine generator has a biased wind speed distribution is set in advance in the pitch angle control part,
when the load measured by the measurement part or a value based on the load is equal to or smaller than the set value, the pitch angle control part outputs the command value corresponding to the load and within predetermined limit values,
only when the load or the value based on the load exceeds the set value, the pitch angle control part outputs the command value corresponding to the load and beyond the limit values, wherein the pitch angle control part outputs the command value beyond the limit values by accumulating a gain corresponding to the load or the value based on the load to the command value, and
when the load measured by the measurement part or the value based on the load exceeds a predetermined threshold value higher than the set value, the gain becomes constant.

2. A blade pitch control system according to claim 1, wherein the actuators change the pitch angles with hydraulic pressure.

3. A wind turbine generator, comprising:
a plurality of blades whose pitch angles are independently controllable; and
a blade pitch control system including
a pitch angle control part for generating and outputting a command value that indicates an amount of change in each of the pitch angles,
actuators each of which changes the corresponding pitch angle based on the corresponding command value output from the pitch angle control part, and
a measurement part for measuring a load imposed on each of the blades, wherein
a set value indicating that wind received by the wind turbine generator has a biased wind speed distribution is set in advance in the pitch angle control part,
when the load measured by the measurement part or a value based on the load is equal to or smaller than the set value, the pitch angle control part outputs the command value corresponding to the load and within predetermined limit values,
only when the load or the value based on the load exceeds the set value, the pitch angle control part outputs the command value corresponding to the load and beyond the limit values, wherein the pitch angle control part outputs the command value beyond the limit values by accumulating a gain corresponding to the load or the value based on the load to the command value, and
when the load measured by the measurement part or the value based on the load exceeds a predetermined threshold value higher than the set value, the gain becomes constant.

4. A blade pitch control method for a wind turbine generator that generates power through rotation of a rotor coupled to a plurality of blades whose pitch angles are independently controllable and includes a pitch angle control part for generating and outputting a command value that indicates an amount of change in each of the pitch angles, actuators each of which changes the corresponding pitch angle based on the corresponding command value output from the pitch angle control part, and a measurement part for measuring a load imposed on each of the blades, the blade pitch control method comprising:
setting in advance a set value indicating that wind received by the wind turbine generator has a biased wind speed distribution;
when the load measured by the measurement part or a value based on the load is equal to or smaller than the set value, outputting the command value corresponding to the load and within predetermined limit values; and
only when the load or the value based on the load exceeds the set value, outputting the command value corresponding to the load and beyond the limit values, wherein
the command value beyond the limit values is outputted by accumulating a gain corresponding to the load or the value based on the load to the command value, and when the load measured by the measurement part or the value based on the load exceeds a predetermined threshold value higher than the set value, the gain becomes constant.

* * * * *